(12) United States Patent
Gomez Mora et al.

(10) Patent No.: US 12,372,065 B2
(45) Date of Patent: Jul. 29, 2025

(54) ROTATING UNBALANCED ROTOR HUBS AND INSTALLING WIND TURBINE ROTOR BLADES

(71) Applicant: General Electric Renovables Espana, S.L., Barcelona (ES)

(72) Inventors: Daniel Gomez Mora, Barcelona (ES); Michael A. Garry, Asheville, NC (US); Jorge Molinari, Greenville, SC (US); Arianna Abram, Schenectady, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/617,848

(22) Filed: Mar. 27, 2024

(65) Prior Publication Data
US 2024/0328394 A1    Oct. 3, 2024

(30) Foreign Application Priority Data
Mar. 28, 2023   (EP) .................................... 23382288

(51) Int. Cl.
*F03D 80/50*  (2016.01)
*F03D 13/10*  (2016.01)

(52) U.S. Cl.
CPC .......... *F03D 80/505* (2023.08); *F03D 13/104* (2023.08); *F05B 2230/608* (2013.01); *F05B 2260/31* (2020.08)

(58) Field of Classification Search
CPC ... F03D 80/505; F03D 13/104; F05B 2260/31
See application file for complete search history.

(56) References Cited

U.S. PATENT DOCUMENTS

| | | |
|---|---|---|
| 3,746,404 A | 7/1973 | Adahan |
| 4,324,098 A | 4/1982 | Aruga et al. |
| (Continued) | | |

FOREIGN PATENT DOCUMENTS

| | | |
|---|---|---|
| CN | 113007016 A | 6/2021 |
| DE | 102004057522 A1 | 4/2006 |
| (Continued) | | |

OTHER PUBLICATIONS

Maria Ebbinghaus, Optical strain gauge technology allows monitoring of Wind Turbine Blade condition, FBGS, Published Mar. 4, 2015 (Year: 2015).*

(Continued)

*Primary Examiner* — Kyle A Cook
(74) *Attorney, Agent, or Firm* — Dority & Manning, P.A.

(57) ABSTRACT

The present disclosure relates to methods for rotating a locked rotor of a wind turbine in case of an imbalance in a rotor plane of the rotor, comprising: rotating the rotor using an inching tool to apply torque on a drive train of the wind turbine to reduce the imbalance in the rotor plane; and removing a locking pin from a locking disc operatively connected to the rotor after reducing the imbalance in the rotor plane. The methods further comprise estimating a direction of a torque load due to the imbalance in the rotor plane using one or more sensors, and impeding the inching tool to apply torque on the drive train of the wind turbine in the estimated direction of the torque load due to the imbalance. The present disclosure further relates to inching tools and to methods for installing rotor blades on a hub of a wind turbine.

8 Claims, 5 Drawing Sheets

(56) References Cited

U.S. PATENT DOCUMENTS

| | | |
|---|---|---|
| 5,590,936 A | 1/1997 | Reuter |
| 5,611,199 A | 3/1997 | Bray |
| 6,564,549 B2 | 5/2003 | Nagura et al. |
| 7,397,145 B2 | 7/2008 | Struve et al. |
| 7,494,193 B2 | 2/2009 | Wedekind |
| 7,948,100 B2 | 5/2011 | Nies et al. |
| 8,692,983 B1 | 4/2014 | Chapman et al. |
| 8,710,693 B2 | 4/2014 | Amano et al. |
| 9,670,904 B2 | 6/2017 | Warfen |
| 9,777,710 B2 | 10/2017 | Muik |
| 10,197,075 B2 | 2/2019 | Brokes et al. |
| 10,215,150 B2 | 2/2019 | Umeda et al. |
| 10,415,544 B2 | 9/2019 | Scholte-Wassink et al. |
| 10,451,045 B2 | 10/2019 | Davoust et al. |
| 10,671,094 B2 | 6/2020 | Kimchi et al. |
| 10,780,988 B2 | 9/2020 | Buchmueller et al. |
| 10,794,436 B2 | 10/2020 | Smith |
| 10,830,209 B2 | 11/2020 | Larsen |
| 10,989,170 B2 | 4/2021 | Li et al. |
| 11,041,482 B2 | 6/2021 | Su |
| 11,149,706 B2 | 10/2021 | Chen et al. |
| 11,174,839 B2 | 11/2021 | Broderick et al. |
| 11,371,570 B2 | 6/2022 | Rogg |
| 11,384,740 B2 | 7/2022 | Levin et al. |
| 11,421,657 B2 | 8/2022 | Laborda Rubio |
| 11,873,795 B2 | 1/2024 | Kofman |
| 2004/0244857 A1 | 12/2004 | Suzuki et al. |
| 2005/0279593 A1 | 12/2005 | Uphues |
| 2006/0140764 A1 | 6/2006 | Smith et al. |
| 2006/0284482 A1 | 12/2006 | Yang |
| 2007/0052290 A1 | 3/2007 | Hwang |
| 2008/0164751 A1 | 7/2008 | Wedekind |
| 2008/0164752 A1 | 7/2008 | Wedekind |
| 2008/0181761 A1 | 7/2008 | Moore et al. |
| 2008/0240922 A1 | 10/2008 | Eusterbarkey |
| 2010/0194114 A1 | 8/2010 | Pechlivanoglou et al. |
| 2010/0202884 A1 | 8/2010 | Wedekind et al. |
| 2010/0232978 A1 | 9/2010 | Nielsen et al. |
| 2011/0123339 A1 | 5/2011 | Eriksen et al. |
| 2011/0133476 A1 | 6/2011 | Nies |
| 2011/0135481 A1 | 6/2011 | Koronkiewicz |
| 2011/0138626 A1 | 6/2011 | Tirumalai et al. |
| 2011/0268571 A1 | 11/2011 | Menke |
| 2011/0280725 A1 | 11/2011 | Taylor et al. |
| 2011/0316278 A1 | 12/2011 | Siegfriedsen |
| 2012/0045340 A1 | 2/2012 | Holling et al. |
| 2012/0073117 A1 | 3/2012 | Benedict |
| 2012/0091724 A1 | 4/2012 | Bodenstein et al. |
| 2012/0131786 A1 | 5/2012 | Neumann |
| 2012/0133147 A1 | 5/2012 | Numajiri |
| 2012/0134816 A1 | 5/2012 | Andersen et al. |
| 2012/0181792 A1 | 7/2012 | Pettersen et al. |
| 2014/0010656 A1 | 1/2014 | Nies |
| 2015/0260164 A1 | 9/2015 | Su |
| 2015/0308467 A1* | 10/2015 | Brokes .................. F03D 13/10 60/435 |
| 2016/0039529 A1 | 2/2016 | Buchmueller et al. |
| 2016/0290318 A1 | 10/2016 | Muik |
| 2018/0038339 A1 | 2/2018 | Umeda et al. |
| 2018/0180029 A1* | 6/2018 | Caponetti ............... F03D 17/00 |
| 2019/0277254 A1 | 9/2019 | Larsen |
| 2022/0228556 A1 | 7/2022 | Vasudevan et al. |

FOREIGN PATENT DOCUMENTS

| | | |
|---|---|---|
| DE | 202007001765 U1 | 5/2008 |
| EP | 1389686 A1 | 2/2004 |
| EP | 1959131 A2 | 8/2008 |
| EP | 3354895 B1 | 9/2020 |
| EP | 3504424 B1 | 2/2021 |
| EP | 3434896 B1 | 5/2021 |
| KR | 101346178 B1 | 12/2013 |
| WO | WO03/080414 A1 | 10/2003 |
| WO | WO2013/042251 A1 | 3/2013 |
| WO | WO2018/036595 A1 | 3/2018 |
| WO | WO2021/008663 A1 | 1/2021 |

OTHER PUBLICATIONS

European Search Report Corresponding to EP23382288 on Sep. 11, 2023.

* cited by examiner

ROTATING UNBALANCED ROTOR HUBS AND INSTALLING WIND TURBINE ROTOR BLADES

FIELD

The present disclosure relates to methods for installing wind turbine rotor blades, and further relates to methods for rotating a rotor of a wind turbine when the rotor is unbalanced, particularly due to one or more rotor blades having been mounted on a hub of the wind turbine, and before all rotor blades have been mounted on the hub.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted through a rotor shaft to a generator, either directly ("directly driven" or "gearless") or through the use of a gearbox. This way, the generator produces electricity which can be supplied to the electrical grid.

A known way of mounting a wind turbine includes the steps of transporting the different elements to the site of the wind turbine. A wind turbine tower may typically comprise a plurality of tower sections which are mounted or stacked on top of each other. The tower sections may be joined to each other at tower flanges.

A large crane may be used to hoist subsequent tower sections and stack them on top of each other. After assembling the tower sections, the wind turbine nacelle may be lifted with the same large crane and can be mounted on top of the tower. Then the wind turbine rotor hub can be lifted with the crane and mounted to a rotor shaft and/or the nacelle.

Additionally, one or more blades are mounted to the wind turbine rotor hub. The rotor hub generally comprises a plurality of annular mounting flanges with openings. The blade can comprise a plurality of fasteners, such as bolts, or pins or studs at its blade root. During installation, these fasteners are to be fitted into the openings in the mounting flanges.

It is also known to hoist a complete rotor assembly, i.e. the hub with the plurality of blades, and mount it to e.g. the nacelle. But in order to mount a complete rotor assembly, a large surface area is required, which is typically not available e.g. in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these operations, the prevailing wind speed has to be below a predetermined value for a prolonged period of time. The period of time depends on the expected length of the installation step and a safety factor to be taken into account.

It is also known to mount each of the plurality of blades in a substantially horizontal orientation or in a substantially vertical orientation. This means that individual installation steps may require less time and may be performed at higher winds, thus increasing the time windows available for installation.

Typically, to install a blade onto the wind turbine hub, the large crane previously used to install e.g. the tower, the nacelle and the rotor hub can be operated in order to raise the blade relative to the rotor hub.

In a typical scenario, a rotor hub may be locked in a specific position such that a first blade may be mounted to the rotor hub, e.g. in a substantially horizontal or a substantially vertical orientation. The rotor hub may be locked by the introduction of one or more locking pins in a locking disc which forms part of or is operatively connected to a drive train of the wind turbine.

After mounting the first blade, the rotor hub is unlocked, i.e. the locking pin(s) are removed from the locking disc. The rotor hub is then rotated to another position such that the second blade may be mounted to the hub. After mounting of the first blade, the rotor is subjected to an imbalance. Specific "inching tools" may be used to relatively slowly the unbalanced rotor.

It has been found that the unbalanced rotor may cause loads on the locking pin which make it impossible to remove the locking pin from the locking disc and thus requires an activation of the inching tool to somewhat compensate the imbalance and remove the locking pin(s) from the locking disc.

The inching tool is installed and may be activated by qualified personnel. Unfortunately it has been found that personnel may incorrectly mount and/or activate the inching tool such that the inching tool is rotated in the wrong direction. This can damage the locking pin, the locking disc and other parts of the drive train and/or bedplate of the wind turbine. In order to avoid such mistakes, the personnel is provided with extensive instructions and is further known to provide markings in the wind turbine itself which should avoid such mistakes. It has been found however that in spite of instructions, markings and other measures, mistakes can still be made.

The present disclosure provides methods and devices to at least partially overcome some of the aforementioned drawbacks.

SUMMARY

In an aspect of the present disclosure, a method for rotating a locked rotor of a wind turbine is provided in a situation of an imbalance in a rotor plane of the rotor. The method comprises rotating the rotor using an inching tool to apply torque on a drive train of the wind turbine to reduce the imbalance in the rotor plane, removing a locking pin from a locking disc operatively connected to the rotor after reducing the imbalance in the rotor plane and rotating the rotor to a desired position. In the method, rotating the rotor to reduce the imbalance in the rotor plane comprises estimating a direction of a torque load due to the imbalance in the rotor plane using one or more sensors, and impeding the inching tool to apply torque on the drive train of the wind turbine in the estimated direction of the torque load due to the imbalance.

According to this aspect, a method is provided in which the inching tool cannot be wrongly used. The imbalance in the rotor plane (e.g. caused by installing of a first or a first and second wind turbine blade) is determined, and the inching tool is prohibited from rotating in the direction of the imbalance. Therefore, even if an operator were to activate the inching tool in the wrong direction, the inching tool cannot carry it out. The drive train of the wind turbine and entire installation on tope of the tower may thus be protected from damage in this procedure.

In an additional aspect, an inching tool configured to rotate a rotor of a wind turbine is provided. The inching tool comprises one or more drives to apply a torque to a drive train of the wind turbine to rotate the rotor and a data acquisition unit configured to receive data from one or more sensors arranged to measure loads or deflections due to an imbalance in a rotor plane of the rotor. The inching tool further comprises a control unit configured to determine a rotational direction of the imbalance in the rotor plane based at least partially on the data from the sensors and further configured to impede the drives to apply torque to the drive train in the determined rotational direction of the imbalance when the rotor is locked.

In yet an additional aspect, a method for mounting a plurality of blades on a rotor of a wind turbine is provided. The method comprises locking a rotor hub of the wind turbine in a first mounting position by a locking pin in a locking disc operatively connected to the rotor hub and mounting a first blade of the plurality of blades on the rotor hub, while the rotor hub is locked in a first mounting position. The method then further comprises rotating the rotor using an inching tool to apply torque on a drive train of the wind turbine to reduce the imbalance in the rotor plane and removing the locking pin from the locking disc after reducing the imbalance in the rotor plane and further rotating the rotor to a second mounting position. Rotating the rotor to reduce the imbalance in the rotor plane herein comprises estimating a direction of a torque load due to the imbalance in the rotor plane caused by the first blade using one or more sensors, and impeding the inching tool to apply torque on the drive train of the wind turbine in the estimated direction.

Additional objects, advantages and features of embodiments of the present disclosure will become apparent to those skilled in the art upon examination of the description, or may be learned by practice.

DETAILED DESCRIPTION OF EXAMPLES

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
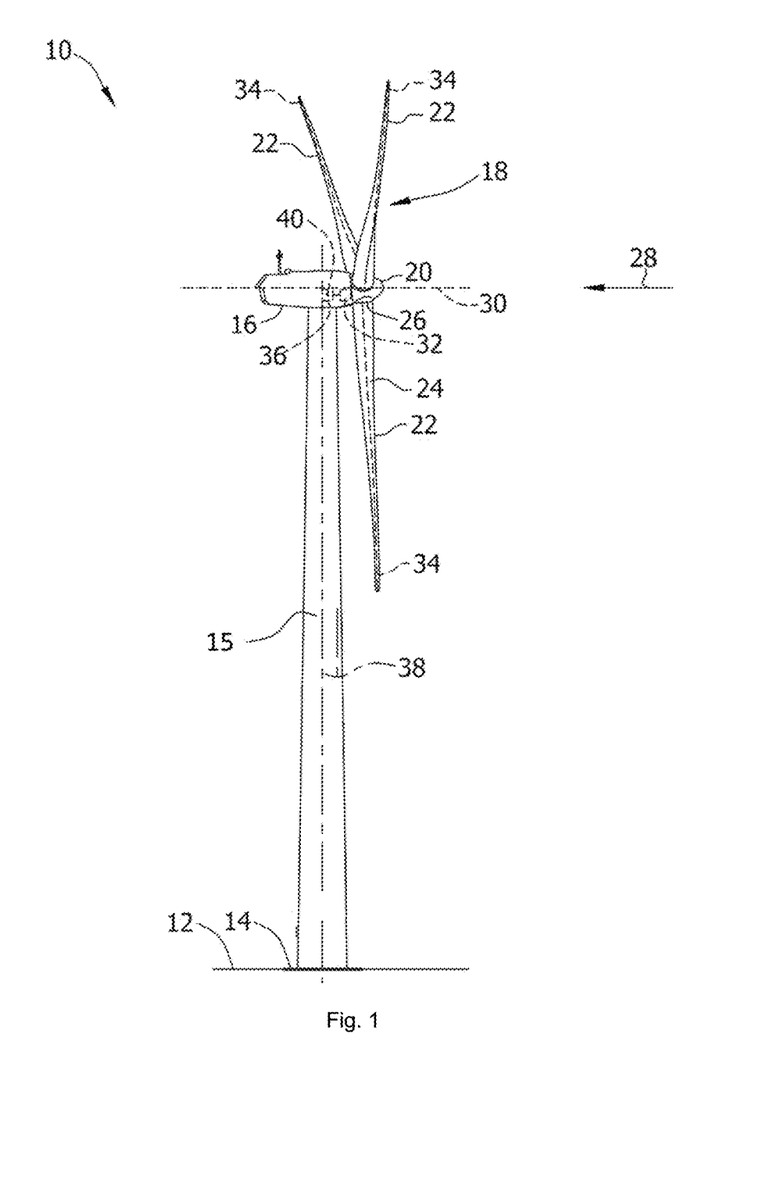
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
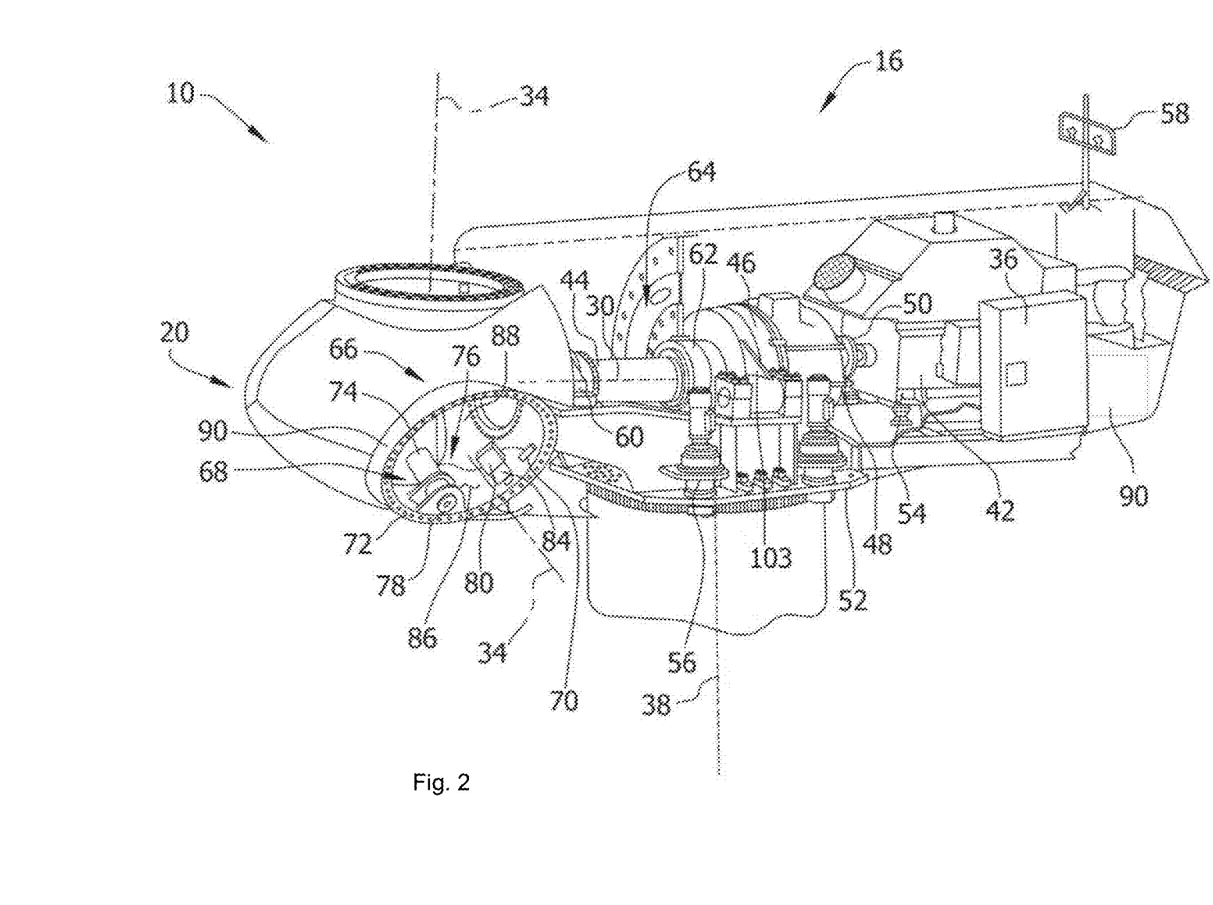
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage e.g., 10-35 KV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
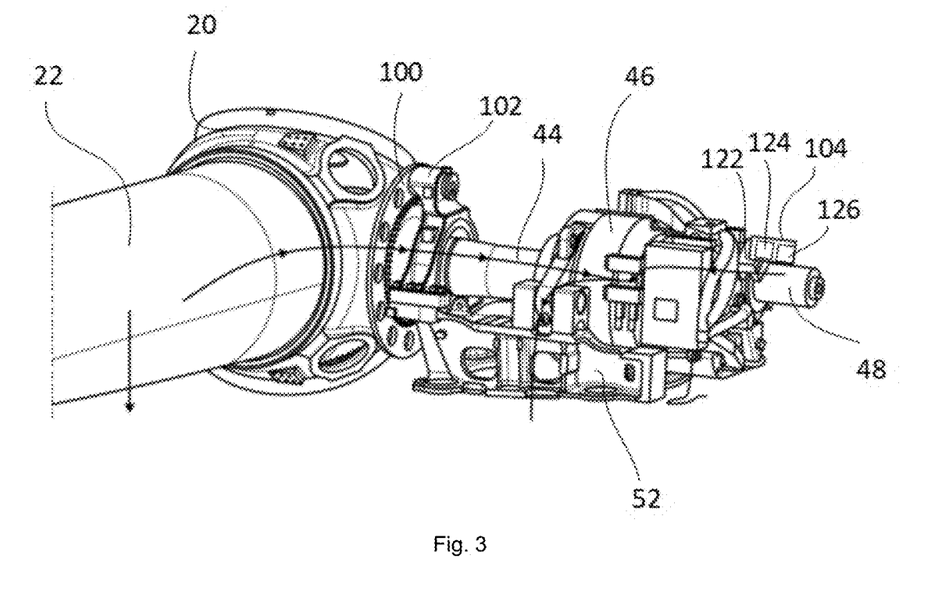
FIGS. 3 and 4 schematically illustrate an example of a drive train of a wind turbine and a load path through components of the drive train.
Figure 4:
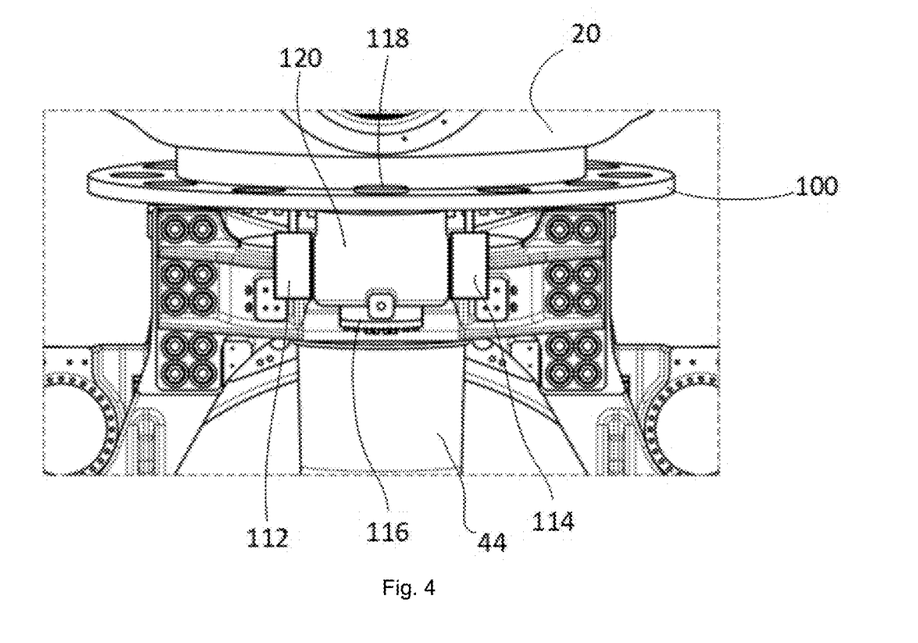

FIG. 3 schematically illustrates an example of a (part of a) drive train of a wind turbine and a load path through components of the drive train. And FIG. 4 provides a different view of the same example. The drive train of the wind turbine in this example comprises a wind turbine rotor, a low speed shaft 44, a gearbox 46 and a high speed shaft 48. The high speed shaft 48 may drive a rotor of a generator (not illustrated in this figure).

In operation, rotation of the hub will rotate the low speed shaft 44, which may also be called the main rotor shaft. The low speed shaft 44 may be supported in the main frame 52 (which may also be called "bedplate") through one or more bearings (not illustrated). The relatively slow rotation of the low speed shaft 44 is converted by the gearbox 46 into a fast rotation of high speed shaft 48.

The wind turbine rotor includes a rotor hub 20 and a plurality of blades 22. In the situation illustrated in FIG. 3, only a single blade 22 has been mounted on the hub 20. This leads to an imbalance in the rotor plane due to the weight of the blade 22.

Further illustrated in FIG. 3 is a locking disc which is operatively connected with the low speed shaft 44. The locking disc 100 may be mounted over the low speed shaft 44. The locking disc 100 comprises a plurality of holes. A locking pin 118 may be inserted into one of these holes. Thereby the locking disc is locked in place and cannot rotate. Because of the operative connection with the low speed shaft 44 (and thereby the remainder of the drive train), the rotor can also not rotate.

Locking of the rotor may be done in order to carry out certain maintenance operation, but in the present case, locking is used during installation of the wind turbine, and more particularly for mounting blades 22 onto the rotor hub 20. Also in this example, a locking disc 100 with a single locking pin 118 is shown, it should be clear that multiple locking pins may be used with a single locking disc. In other examples, multiple locking discs may be provided.

In the situation illustrated in FIG. 3, a single blade 22 has been mounted to the hub 22. The weight of the single blade causes a vertical force downwards, and a rotational torque about a central axis of the rotor hub 20. The rotational torque is absorbed by the locking pin in one of the holes of the locking disc.

After installation of one of the blades, the rotor hub 20 may need to be rotated to a different position so that a subsequent blade 22 may be installed. When mounting such a blade, the locking disc may again be locked by the locking pin 118, which in this situation is inserted in a different hole of the locking disc.

In order to rotate the hub 20 and blade 22 in the case of an imbalance, an inching tool 104 may be used. The inching tool 104 may drive the high speed shaft in a desired direction to rotate the hub to the next desired position.

Before actually rotating the hub, the locking pin first needs to be released from the locking disc. In order to reduce the loads on the locking pin prior to its release, inching tool 104 may be used. The inching tool 104 is to be rotated in a direction to reduce the imbalance in the rotor.

FIG. 4 shows the locking disc 100 and locking pin 118 in more detail. The locking pin 118 may be driven using an actuator 116 attached at a back side of housing or "pillow block" 120. Actuator 116 may be configured as or comprise a threaded actuator, which threadedly engages the locking pin 118 to displace axially by rotating the threaded actuator in one direction or the other. On either side of the housing 120, in this example, sensors 112 and 114 are mounted. Further details of FIG. 4 will be commented hereinafter with reference to a method 200 illustrated in FIG. 5.

Figure 5:
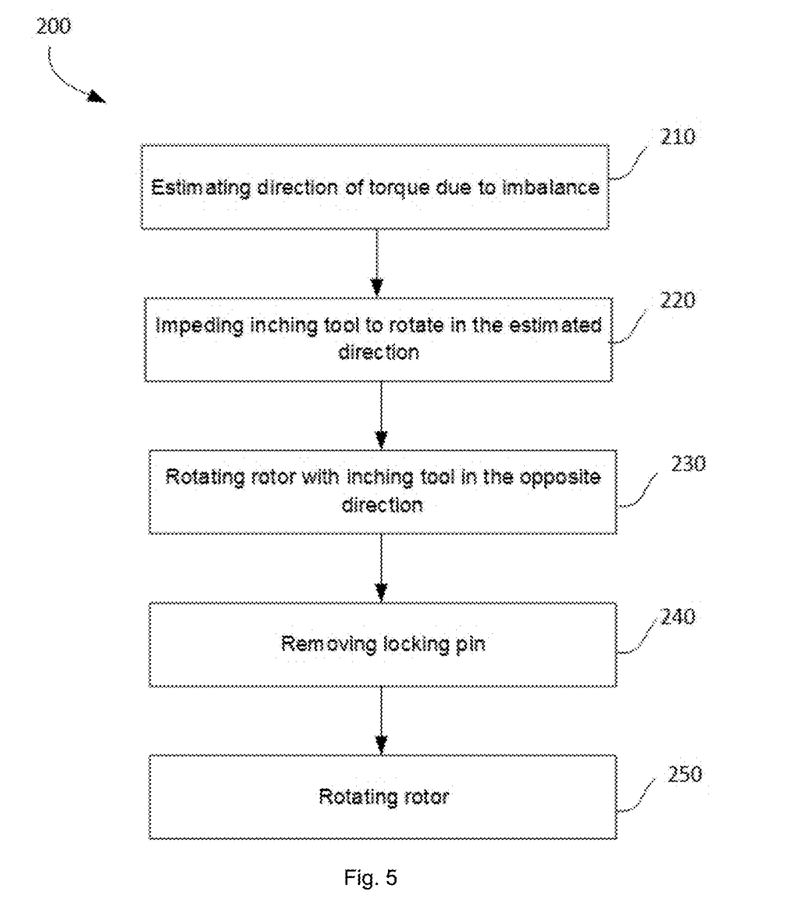
FIG. 5 schematically illustrates a flowchart of an example for rotating a rotor in the case of an imbalance in the rotor plane.

In an aspect of the present disclosure, a method 200 for rotating a locked rotor of a wind turbine in a situation of an imbalance in the rotor plane of the rotor is provided. Such a method 200. The method 200 comprises, rotating the rotor, at block 230 using an inching tool to apply torque on a drive train of the wind turbine to reduce the imbalance in the rotor plane. The method further comprises, at block 240, removing a locking pin 110 from a locking disc 100 which is operatively connected to the rotor after reducing the imbalance in the rotor plane. The method then comprises, at block 250, (further) rotating the rotor to a desired position.

According to this method 200, rotating the rotor to reduce the imbalance in the rotor plane comprises estimating, at block 210, a direction of a torque load due to the imbalance in the rotor plane using one or more sensors, and impeding, at block 220, the inching tool to apply torque on the drive train of the wind turbine in the estimated direction of the torque load due to the imbalance. That is, the inching tool is not allowed to be operated in the wrong direction of rotation. To this end, the direction of rotation of the imbalance in the rotor is determined first, and only an operation of the inching tool in the opposite direction is allowed.

In examples, the imbalance in the rotor plane is due to two rotor blades being mounted to the rotor. In general, the imbalance of the rotor may be caused by mounting less than all blades to the rotor. In examples, the method 200 may further comprise mounting a further rotor blade to the rotor after rotating the rotor to the desired position.

In examples, the sensors for estimating a direction of torque load due to the imbalance in the rotor plane comprise strain gauges. Strain gauges are well-known and used to measure strain on an object. The gauge may be attached to a component by a suitable adhesive. As the component is deformed, a foil of the strain gauge may be deformed, causing its electrical resistance to change. An imbalance in the rotor plane will cause unbalanced loads in the hub 20, which will be transmitted to the low speed shaft 44, to the main frame 52 (through the bearings supporting the low speed shaft 44), and to the gearbox and high speed shaft. The locking disc 100 is mounted over the low speed shaft 44 in this example and may also be subjected to unbalanced loads. A locking mechanism 102 may comprise a locking pin 118 (further illustrated in FIG. 4) which can be inserted in one of the holes of the locking disc 100 and maintains the rotor locked will also be subjected to the loads. The strain caused by such unbalanced loads may thus be measured at multiple positions.

In some examples, the sensors may comprise optical sensors. A deflection of a component caused by specific loads may also be measured using other sensors, like optical sensors.

In some examples, the estimating the direction of the torque load due to imbalance may comprise measuring a load on or deflection of the locking pin 118.

Additionally or alternatively, estimating the direction of the torque load due to imbalance may comprise measuring a load on or deflection of the locking disc. In a specific example, estimating the direction of the torque load comprises measures a distance between the locking disk and a frame of the wind turbine. Such an example may be illustrated with reference to FIG. 4. In FIG. 4, a first optical sensor 112 and a second optical sensor 114 are provided. It has been found that an imbalance in the rotor plane, specifically caused by having at least one rotor blade, but not all rotor blades installed can cause a bending moment in the locking disc 100. On one side of housing 120, the locking disc 100 will have a tendency to move axially forward (or rearward, depending on the loading of the hub), and on the other side of the housing 120, the locking disc will have a tendency to move axially rearward (or forward, depending on the loading of the hub). Optical sensors 112, 114 (or other suitable proximity sensors) may be used to detect such a deflection of the locking disc and thereby determine the loading on the hub.

In this specific example, estimating the direction of the torque load due to the imbalance in the rotor plane may comprise comparing readings from a plurality of sensors while the rotor is subjected to the unbalanced load. The readings of sensor 112 will show an opposite pattern to the readings of sensor 114.

In another example, estimating the direction of the torque load due to the imbalance in the rotor plane comprises monitoring a single sensor reading prior to and while the rotor is subjected to the unbalanced load. If a single sensor is used, the correct determination of the imbalance in the rotor plane may still be made when using readings e.g. prior to installing a blade, and after installing a blade. Particularly, the variation in the readings over time can indicate the imbalance that has been introduced.

In a further aspect of the present disclosure, an inching tool 104 configured to rotate a rotor of a wind turbine is provided. The inching tool 104 comprises one or more drives 122 to apply a torque to a drive train of the wind turbine to rotate the rotor. The inching tool 104 further comprises a data acquisition unit 124 configured to receive data from one or more sensors arranged to measure loads or deflections due to an imbalance in a rotor plane of the rotor and further comprises a control unit 126 configured to determine a rotational direction of the imbalance in the rotor plane based at least partially on the data from the sensors. The control unit is further configured to impede the drives 122 to apply torque to the drive train in the determined rotational direction of the imbalance when the rotor is locked.

In some examples, the one or more drives 122 may include comprise a gearbox and a pinion configured to engage with an annular gear.

In the example illustrated in FIG. 3, the inching tool 104 is configured to apply torque to a high speed shaft 48 of the wind turbine. By arranging the inching tool 104 with the high speed shaft, the inching tool 104 does not have to provide a large torque. A relatively small and quick torque is converted by the gearbox 46 in a high and slow torque in the low speed shaft 44. In other examples, the inching tool 104 may be arranged elsewhere.

The data acquisition unit 124 may have suitable wires or a suitable wireless connection with sensors arranged in the wind turbine. The control system 126 is configured to, based on the data from the sensors, determine a direction of the imbalance in the rotor. The control system 126 can then block operation in that direction, i.e. even if an operator were to give a signal to start rotating in that specific direction, an override signal can be issued which blocks the inching tool 104.

In examples, the data acquisition unit 124 may form part of the control system 126.

Figure 6:
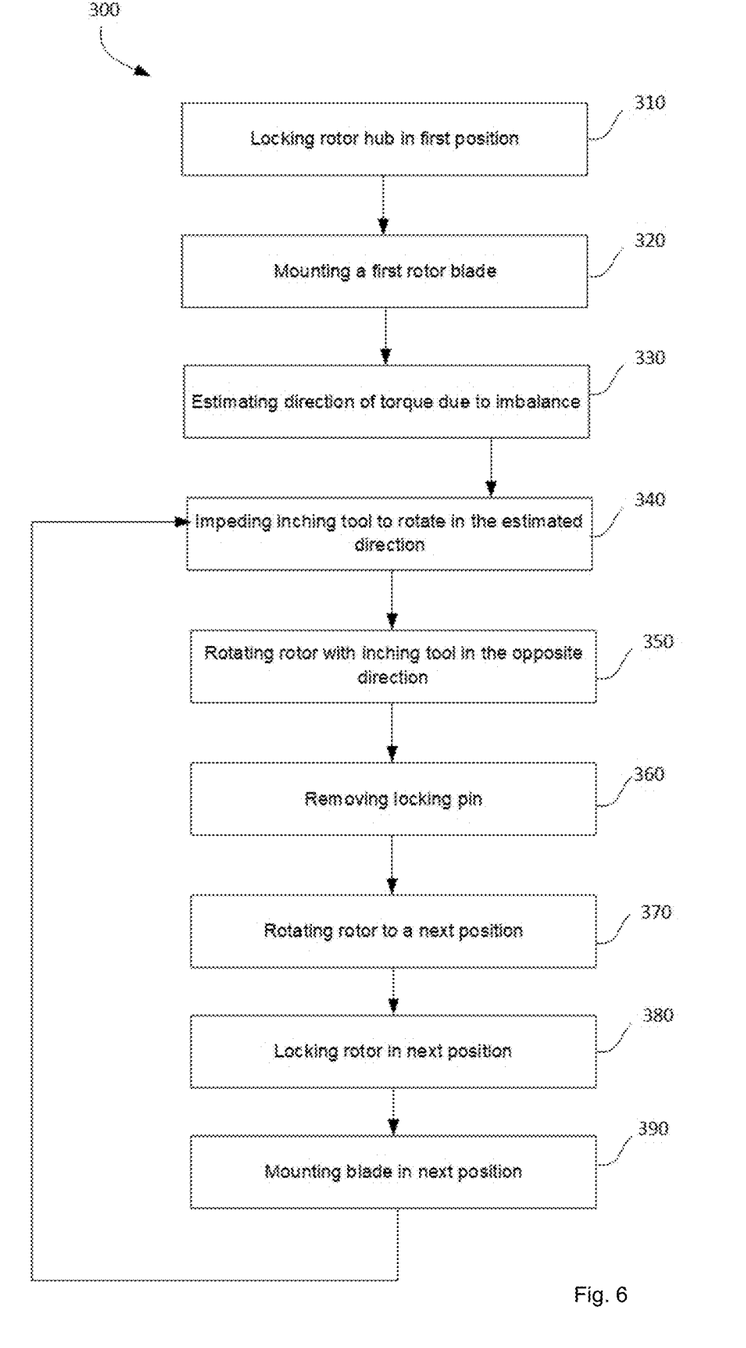
FIG. 6 shows a flowchart of an example for mounting rotor blades to a rotor hub.

FIG. 6 schematically illustrates an example of a method 300 for mounting a plurality of blades on a rotor of a wind turbine according to a further aspect of the present disclosure. The method comprises, at block 310, locking a rotor hub 20 of the wind turbine in a first mounting position by introducing a locking pin 118 in a locking disc 100 which is operatively connected to the rotor hub 20. The method further comprises, at block 320, mounting a first blade of the plurality of blades on the rotor hub, while the rotor hub is locked in a first mounting position.

The method then comprises, at block 330, estimating a direction of a torque load due to the imbalance in the rotor plane caused by the first blade using one or more sensors. Suitable sensor have been illustrated hereinbefore. At block 340, the inching tool is impeded from applying torque on the drive train of the wind turbine in the estimated direction. In examples, a suitable control system of the inching tool may impede this rotation.

Then, the method may further comprises, at block 350, rotating the rotor using an inching tool 104 to apply torque on a drive train of the wind turbine to reduce the imbalance in the rotor plane. I.e. a rotation in the opposite direction is allowed. The rotation will reduce the loads on the locking pin. In examples, the imbalance may be substantially completely compensated by the inching tool 104.

The method further comprises, at block 360, removing the locking pin from the locking disc after reducing the imbalance in the rotor plane, and at block 370, further rotating the rotor to a second mounting position.

In examples, the method 300 may comprise, at block 380, locking the rotor in the second mounting position, and at block 390, mounting a second blade of the plurality of blades while the rotor hub is in the second mounting position.

The steps of determining the direction of the imbalance and impeding further rotation in that direction may be repeated prior to installing a third wind turbine rotor blade.

The same methods and systems as illustrated hereinbefore may be used for determining the direction of the imbalance in the rotor plane and impeding the inching tool from acting further in that direction.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for rotating a rotor of a wind turbine that is locked due to an imbalance of the rotor in a rotor plane, the method comprising:
    rotating the rotor using an inching tool to apply torque on a drive train of the wind turbine to reduce the imbalance in the rotor plane;
    removing a locking pin from a locking disc operatively connected to the rotor after reducing the imbalance in the rotor plane;
    rotating the rotor to a desired position;
        wherein rotating the rotor to reduce the imbalance in the rotor plane comprises:
        estimating a direction of a torque load on the rotor due to the imbalance in the rotor plane using one or more sensors, wherein estimating the direction of the torque load comprises measuring a load on or deflection of the locking disc, and wherein estimating the direction of the torque load comprises measuring a distance between the locking disk and a frame of the wind turbine; and
    impeding the inching tool from applying torque on the drive train of the wind turbine in the estimated direction of the torque load on the rotor due to the imbalance.

2. The method of claim 1, wherein at least one of the sensors comprises a strain gauge.

3. The method of claim 1, wherein the sensors are optical sensors.

4. The method of claim 1, wherein estimating the direction of the torque load comprises comparing readings from a plurality of sensors while the rotor is subjected to the imbalance.

5. The method according to claim 1, wherein estimating the direction of the torque load comprises measuring a load on or deflection of the locking pin.

6. The method of claim 1, wherein the imbalance on the rotor in the rotor plane is due to installing blades on a hub of the rotor.

7. The method of claim 6, further comprising, after mounting less than all of the blades on the hub, mounting a further blade on the hub.

8. The method of claim 7, wherein mounting the further rotor blade comprises:
    rotating the rotor to a further mounting position;
    locking the rotor in the further mounting position; and
    mounting the further blade while the rotor hub is in the further mounting position.

* * * * *